Aug. 30, 1932.  A. DEWANDRE  1,875,226
POWER STEERING GEAR
Filed Aug. 13, 1927    2 Sheets-Sheet 1

INVENTOR
A. DEWANDRE,
BY Jno Imirie
ATTY.

Patented Aug. 30, 1932

1,875,226

UNITED STATES PATENT OFFICE

ALBERT DEWANDRE, OF LIEGE, BELGIUM, ASSIGNOR TO SERVO-FREIN DEWANDRE, SOCIÉTÉ ANONYME, OF LIEGE, BELGIUM

POWER STEERING GEAR

Application filed August 13, 1927, Serial No. 212,748, and in France August 14, 1926.

The object of the present invention is to provide a servo-motor suitable for transmitting and exerting power from a source other than the driver, on the steering rigging of an automobile or analogous vehicle, the driver controlling the transmission of the said power.

In particular, the use of the said servo-motor enables the relatively large physical effort that the driver would otherwise have to exert, to be reduced to a simple manipulation of a control device establishing a suitable connection between the motor member and a member integral with the steering rigging.

This advantage is of great importance especially for driving all vehicles provided with internal combustion engines, and particularly heavy vehicles, but it is to be understood that the servo-motor designed according to the invention can also be applied to any vehicle operated by any other kind of machine, such as a steam engine, an electric motor, etc.

According to the invention, the power necessary for operating the steering gear is produced, for example, by means of the rarefaction created by the suction of the internal combustion engine moving the vehicle, when the throttle valve controlling the admission of the mixture from the carburettor to the engine is in the position corresponding exactly or approximately to the operation of the latter at slow speed without load. The said partial vacuum is transmitted to one or two cylinders in which one or two pistons, connected to the steering rigging can move.

The above mentioned power can also be produced by a fluid or a liquid under pressure, the said pressure being obtained either from the engine cylinder or cylinders, during the explosions or from a compressor operated by the engines, or by oil or another liquid put under pressure by a pump driven by the said engine.

It is evident that in the latter cases, the opening of the duct leading the fluid or liquid under pressure to the distribution valve, will be located so that the said pressure will act on the outer surface of the slide valve.

The said cylinders can be put into communication either with the atmosphere or with the rarefaction, by means of a suitable valve which is operated by the lever on which the driver acts, by the medium of the usual steering wheel.

In addition, the said operating lever is connected to the steering rigging by means of assembling members that enable it to move relative to the said rigging. This relative movement controls the movement of the distribution valve and, in addition enables the steering rigging to be operated directly by stops when the members are again in contact.

By way of example, the accompanying drawings show diagrammatically a form of apparatus embodying the invention. In these drawings.

Figure 1:
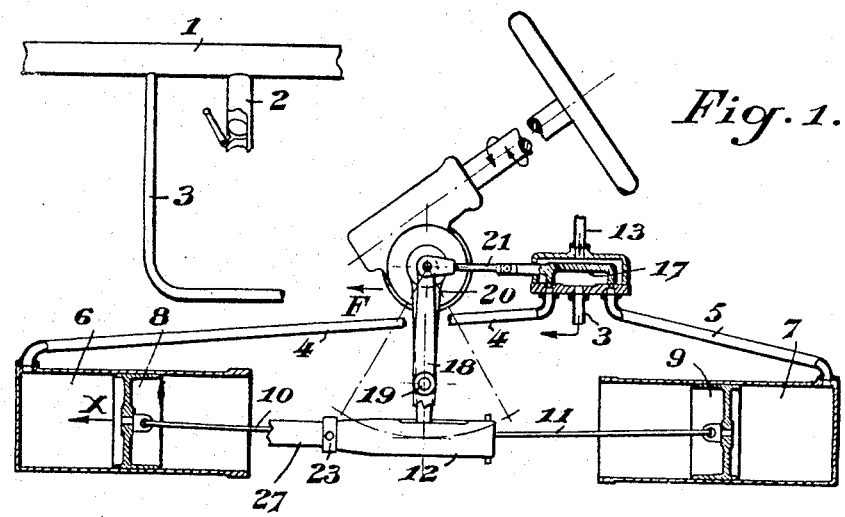
Fig. 1 represents a diagrammatic longitudinal section of the servo-motor and accessories.
Figure 2:
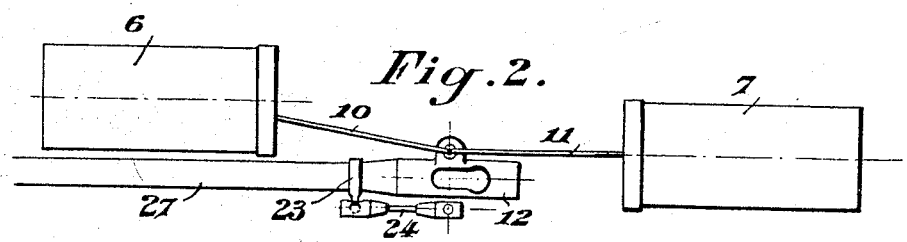
Fig. 2 is a diagrammatic plan of the universal joint casing on the steering rod showing the point of attachment of the cables or rods on the pistons acting in the servo-motor cylinders and the point of attachment of the rod operating the lever on the slide valve.

As is shown in Fig. 1, the admission piping 1 of the internal combustion engine (not represented), on which piping the duct 2 of the carburettor (not represented) is branched, is connected by the pipes 3, 4 and 5 to two cylinders 6 and 7 in which the pistons 8 and 9 can slide. The outer faces of the said pistons are connected to the universal joint casing 12 by means of rods or cables 10 and 11.

The servo-motor cylinders communicate with the atmospheric air through a duct 13 preferably connected to the upper chamber of the engine crank case (not shown). The air coming from the said chamber is saturated with oil vapor and its circulation through the distribution valve and through the servo-motor cylinder or cylinders automatically lubricates the said members.

Figure 5:
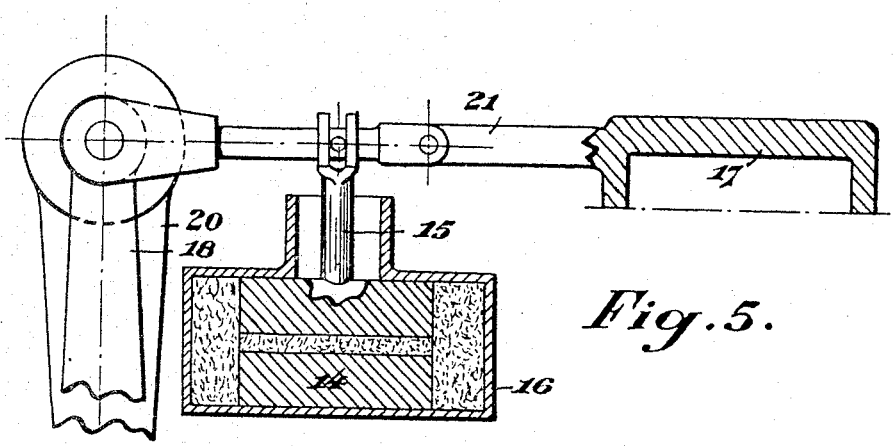
Fig. 5 represents a diagrammatical longitudinal section of a damping device for damping out the oscillations transmitted to the slide valve by the steering rod connected to the lever operating the said slide valve.
Figure 6:
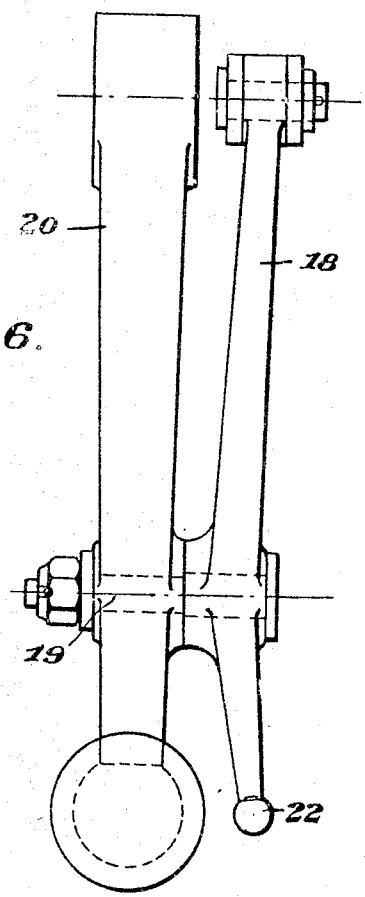
Fig. 6 is a side view of the slide valve operating lever pivotally mounted on the steering lever.

A damping device, composed preferably, according to the design diagrammed in Fig. 5, of a piston 14 fitted with a rod 15 and capable of moving in a cylinder 16 filled with oil or with any other liquid, enables the oscillations due to vibration of the body to be damped out. The piston 14 is pierced with a hole having a relatively small area, so as to offer a certain resistance to the passage of the oil or other liquid, and is connected to the distribution valve operating rod 21 by means of the piston rod 15. It is evident that the damping device need not necessarily be hydraulic. It can also be of the friction type or any other suitable type.

Figure 3:
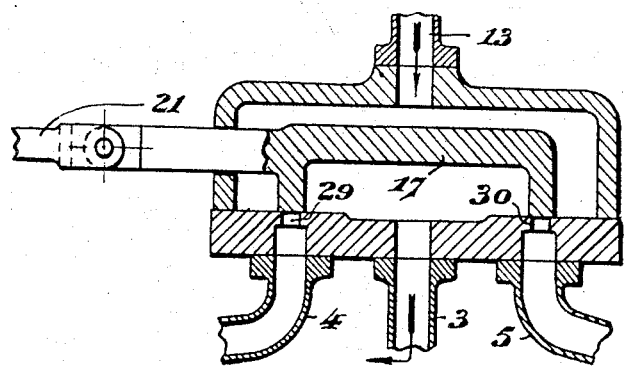
Fig. 3 is a detailed view of the slide valve.

A distribution valve preferably composed, according to the form of construction represented in Figs. 1 and 3, of a flat or cylindrical slide valve 17, for which two poppet valves could be substituted, enables the cylinders 6 and 7 to be put into communication either with the atmospheric air (engine crank casing) or with the rarefaction created in intake piping 1 of the engine driving the vehicle, but in such a way that the said intake piping can never be in communication with the atmosphere by the effect of the distribution valve.

It is apparent (Figs. 1 and 3) that if the slide valve 17 moves to the left, the rarefaction produced by the engine suction in the pipe 1 will be transmitted to the servo-motor cylinder 6. The effect of the said rarefaction will be to draw the piston 8 towards the bottom of the cylinder, in the direction of the arrow X, the said piston carrying along with it the cable or the rod 10 connected to the universal joint casing 12 so that the steering wheels of the vehicle will be directed. If at this moment the slide valve 17 is brought back to its closed position, the piston 8 will theoretically remain in the position occupied, until communication with the atmosphere is established and thus enables the piston 8 to return in the direction opposite to the arrow X.

In order to co-ordinate the movements of the pistons in the servo-motor cylinders, with the movements of the steering wheel, the slide valve 17 is operated by the said steering wheel by means of the lever 18 pivoting at the point 19 on the steering lever 20. The lever 18 is connected to the slide valve 17 by a rod 21. The end 22 of the lever 18 is connected by a rod 24 to a part 23 rigidly attached to the universal joint casing 12. In the inactive position (Fig. 1), communication between the servo-motor cylinders and the engine intake piping or the atmosphere is shut off. If this position, shown in Fig. 1, is considered, it is evident that any movement of the slide valve 17 has the effect of putting one of the cylinders in communication with the engine intake piping, and the other cylinder in communication with the atmosphere.

Figure 4:
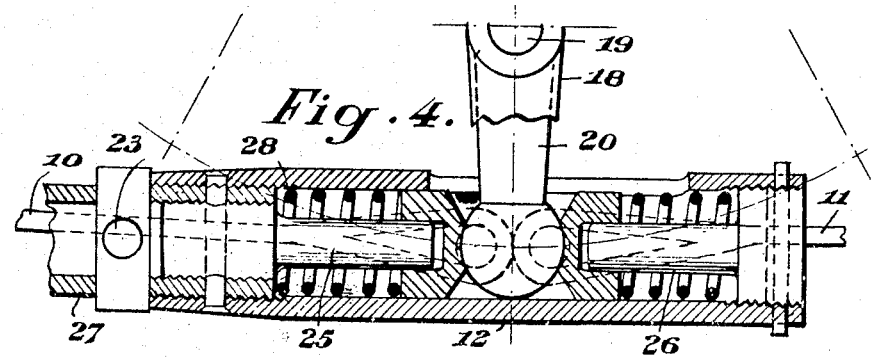
Fig. 4 is a detailed view of the universal joint.

It is also to be noted that the universal joint casing 12 (Fig. 4) contains two stops 25 and 26 so that when the steering lever 20 is against either of the said stops 25 or 26, i. e. in a position such that one of the cylinders is in communication with the engine intake piping, the said steering lever moves the steering rod 27 directly.

This arrangement will enable the power of the servo-motor to be supplemented by direct action on the steering wheel. It is evident that the amplitude of the possible movement of the universal joint casing 12 relative to the lever 20, on account of the springs 28, will have to be sufficient to enable the valve to be operated before the steering rod is moved directly. By this arrangement, the effect of an initial movement of the steering lever 20 in the direction of the arrow F (Fig. 1) is to compress the spring 28 and to move the lever 18 in the same direction by means of the pivot 19. The said lever 18 will pivot at 22 on the end of the rod 24 which is rigidly attached to the universal joint casing 12, and will move the slide valve by means of the rod 21. The slide valve will uncover the ports 29 and 30, thus admitting the rarefaction into the servo-motor cylinder 6 and the atmospheric air into the cylinder 7.

If the steering wheel is held immovable in a given position, the piston 8 in the cylinder 6 will still move a very short distance. At this moment the cylinder 6 is still in communication with the intake piping 1, but as soon as the lever 18, pivoting at 19, has moved the valve 17 so as to cover the ports 29 and 30, the pistons will come to a stop in the cylinders and a given direction of the wheels will be obtained.

By operating the steering lever in the opposite direction, the same effects will be repeated with the cylinder 7.

Evidently the servo-motors will only act in response to operation of the steering wheel provided that there be sufficient rarefaction in the intake piping, but it will always be possible for the driver to cause such a rarefaction by closing the gas throttle valve, i. e. by ceasing to press down on the pedal of the accelerator.

It is evident that the effect of the servo-motor could be obtained by using a single cylinder and causing the rarefaction to act alternately on either of the faces of the piston.

What I claim is:

A steering means for motor vehicles including a steering member, manually operable steering means including an arm connected with said member, the connection between the arm and member providing for a limited free spring-resisted movement of the arm without affecting the member, opposing cylinders, pistons in the cylinders, connections between the pistons and steering member adjacent the connection of the arm with said member, a valve for controlling the operation of the respective pistons, a lever fulcrumed on said arm, a connection between one end of the lever and the steering member, a conection between the other end of the lever and said valve, and a damping device carried by the latter connection.

In witness whereof I affix my signature.

ALBERT DEWANDRE.